US009399312B2

(12) United States Patent
Kimberlin et al.

(10) Patent No.: US 9,399,312 B2
(45) Date of Patent: Jul. 26, 2016

(54) PLASTIC PUMP HOUSING AND MANUFACTURE THEREOF

(71) Applicant: Standex International Corporation, Salem, NH (US)

(72) Inventors: Robert R. Kimberlin, Murfreesboro, TN (US); William M. Larson, Murfreesboro, TN (US); Jie Jiang, Nashville, TN (US); Mary E. Allocco, Woodbury, TN (US)

(73) Assignee: Standex International Corporation, Salem, NH (US)

( * ) Notice: Subject to any disclaimer, the term of this patent is extended or adjusted under 35 U.S.C. 154(b) by 522 days.

(21) Appl. No.: 14/032,774

(22) Filed: Sep. 20, 2013

(65) Prior Publication Data

US 2014/0021650 A1    Jan. 23, 2014

Related U.S. Application Data

(63) Continuation-in-part of application No. 13/417,703, filed on Mar. 12, 2012.

(60) Provisional application No. 61/452,304, filed on Mar. 14, 2011.

(51) Int. Cl.
  *B29C 33/00* (2006.01)
  *F01C 21/00* (2006.01)
  (Continued)

(52) U.S. Cl.
  CPC ....... *B29C 33/0033* (2013.01); *B29C 45/14336* (2013.01); *B29C 45/14598* (2013.01);
  (Continued)

(58) Field of Classification Search
  CPC ................... B29C 33/0033; B29C 45/14598; B29C 45/14614; B29C 45/14631; B29C 45/14336; B29C 45/2628; B29C 45/33; B29C 45/0005; B29C 33/42; B29C 67/00; B29C 45/14754; B29C 45/1477; F04C 2/344; F04C 2230/21; F04B 53/16; F01C 21/10; B29L 2031/7496; F05C 2253/04; F05C 2225/00
  USPC ........... 264/64, 144, 145, 242, 275, 299, 318, 264/328.1–328.19, 334; 417/307–311; 425/441, 577, DIG. 58, 470; 415/182.1
  See application file for complete search history.

(56) References Cited

U.S. PATENT DOCUMENTS

| 4,543,228 A | 9/1985 | Bingler |
| 4,830,573 A | 5/1989 | Campbell |

(Continued)

FOREIGN PATENT DOCUMENTS

| CA | 1058447 | 7/1979 |
| CA | 1315599 | 4/1993 |

(Continued)

OTHER PUBLICATIONS

International Search Report and Written Opinion of PCT/US2012/028746, date of mailing Jul. 6, 2012, from the International Searching Authority, European Patent Office, Authorized Officer Ingo Meyer (13 pages).

*Primary Examiner* — James Sanders
*Assistant Examiner* — Leith S Shafi
(74) *Attorney, Agent, or Firm* — Luedeka Neely Group, P.C.

(57) ABSTRACT

A method of making a pump housing that is net-molded and immediately assumes its final shape and design specification without requiring more than de minimis secondary machining processes. The method utilizes molds and cores configured such that none of the fluid ports of the housing produced using the molds and cores have any intersecting geometry. The net-molded pump housing may also include a cross-tube insert providing flow communication between a fluid inlet port and a pressure relief port.

6 Claims, 19 Drawing Sheets

(51) Int. Cl.
  *B29C 45/26* (2006.01)
  *F01C 21/10* (2006.01)
  *F04B 53/16* (2006.01)
  *F04C 2/344* (2006.01)
  *B29C 45/14* (2006.01)
  *B29C 45/33* (2006.01)
  *B29C 45/00* (2006.01)
  *B29L 31/00* (2006.01)

(52) U.S. Cl.
  CPC ..... *B29C45/14614* (2013.01); *B29C 45/14631* (2013.01); *B29C 45/2628* (2013.01); *F01C 21/10* (2013.01); *F04B 53/16* (2013.01); *F04C 2/344* (2013.01); *B29C 45/0005* (2013.01); *B29C 45/33* (2013.01); *B29L 2031/7496* (2013.01); *F04C 2230/21* (2013.01); *F05C 2225/00* (2013.01); *F05C 2253/04* (2013.01)

(56) References Cited

U.S. PATENT DOCUMENTS

| | | |
|---|---|---|
| 5,642,991 A | 7/1997 | Singleterry et al. |
| 5,660,536 A | 8/1997 | Karls et al. |
| 6,847,140 B2 | 1/2005 | Kimberlin et al. |
| 8,347,780 B2 | 1/2013 | Fong et al. |
| 8,425,200 B2 | 4/2013 | Tran et al. |
| 2005/0214153 A1 | 9/2005 | Citro et al. |
| 2009/0104049 A1 | 4/2009 | Jang et al. |
| 2009/0180913 A1 | 7/2009 | Kimberlin |
| 2010/0111730 A1 | 5/2010 | Peterreins et al. |
| 2013/0003495 A1 | 1/2013 | Pyddoke |

FOREIGN PATENT DOCUMENTS

| | | |
|---|---|---|
| CN | 202182054 | 4/2012 |
| JP | 46-25456 B2 | 9/1971 |
| WO | 9512069 | 5/1995 |
| WO | 2010122299 | 10/2010 |

PLASTIC PUMP HOUSING AND MANUFACTURE THEREOF

CROSS-REFERENCE TO RELATED APPLICATION

This application is a continuation-in-part of U.S. patent application Ser. No. 13/417,703, filed Mar. 12, 2012, and entitled "Plastic Pump Housing and Manufacture Thereof," incorporated herein by reference in its entirety. This application also claims priority to U.S. Provisional Application Ser. No. 61/452,304, filed Mar. 14, 2011, and entitled "Plastic Pump Housing and Manufacture Thereof," incorporated herein by reference in its entirety.

FIELD

This disclosure relates to the field of fluid pump manufacture. More particularly, this disclosure relates to methods for making net-shape molded plastic pump housings by utilizing molds and cores configured such that none of the fluid ports of the housing produced using the molds and cores have any intersecting geometry.

BACKGROUND

To reduce costs associated with the manufacture of positive displacement pumps, especially those of the type used in food applications, it is desirable to utilize materials less expensive than conventional brass and stainless steel materials used to make the pump housing. Plastic materials suitable for use as a pump housing material for food applications typically must be suitable for use in high temperature conditions, which conditions often exceed 300 degrees F. The use of plastics is also advantageous to eliminate sources of lead from the pump system. In food and drinking water applications, this is a very desirable feature.

Glass filled plastics are often suitable for use in such high temperatures, however, guidelines typically associated with the use of plastics in food applications, such as those set forth by NSF International, typically limit the amount of glass fiber exposed to the surface of wetted parts, such as interior surfaces of the pump housing, to one inch of exposed glass fiber or less. As a practical matter, if significant secondary machining of the plastic part is required, the level of exposed fiber will usually exceed the limit.

Conventional molds and molding techniques desire improvement in connection with the manufacture of plastic pump housings. Such molds and techniques result in housings requiring significant secondary machining, and thus are unsuited for making housings for food applications.

Accordingly, what is desired is an improved method of making a plastic housing that is suitable for food applications and, as molded is ready for use and any additional machining needed is de minimis and less than about one square inch of the wetted interior surface is subjected to further machining after being formed by molding.

SUMMARY

The above and other needs are met by a method of making a net molded plastic pump housing having a fluid inlet port, a fluid outlet port, and a pressure relief valve port, each in flow communication with a pump cavity.

In a method according to the disclosure, the method includes the steps of: providing a first mold having has an interior surface topography configured to correspond in negative to exterior topographies of a first portion of the housing and to correspond in negative to topography associated with the fluid inlet port, the fluid outlet port, and the relief valve port of the housing; providing a second molding having an interior surface topography configured to correspond in negative to exterior topographies of a second portion of the housing; providing a first core having an exterior shape configured to correspond in negative to interior topographies of a proximate portion of the cavity of the housing; and providing a second core having an exterior shape configured to correspond in negative to interior topographies of a distal portion of the cavity of the housing.

The first and second molds and the first and second cores are configured such that none of the fluid inlet port, the fluid outlet port, or the pressure relief valve port of the housing produced using the molds and cores have any intersecting geometry.

The first and second molds are assembled facing one another with the first and second cores positioned adjacent one another in an end-to-end relationship within the molds, after which plastic is introduced. After the plastic cures, the molds are pulled opposite one another and the cores are pulled opposite one another and substantially perpendicular to the pull of the molds to yield the net shape molded housing.

The resulting pump housings do not require secondary machining and may be suitable for food applications.

Also disclosed is a mold and core system for making a net molded plastic pump housing.

In another aspect, the present invention provides a method of making a net molded plastic pump housing having a fluid inlet port, a fluid outlet port, and a pressure relief valve port, each in flow communication with a pump cavity. In one embodiment, the method includes the steps of: providing a first mold having has an interior surface topography configured to correspond in negative to exterior topographies of a first portion of the housing and to correspond in negative to topography associated with the fluid inlet port, the fluid outlet port, and the relief valve port of the housing; providing a second mold having an interior surface topography configured to correspond in negative to exterior topographies of a second portion of the housing; providing a first core having an exterior shape configured to correspond in negative to interior topographies of a proximate portion of the cavity of the housing; providing at least a second core having an exterior shape configured to correspond in negative to interior topographies of a distal portion of the cavity of the housing; and providing a cross-tube insert having a hollow, generally cylindrical shape.

The first and second molds and the first and second cores are configured such that none of the fluid inlet port, the fluid outlet port, or the pressure relief valve port of the housing produced using the molds and cores have any intersecting geometry. Further, the first and second molds are assembled facing one another with the first and second cores positioned adjacent one another in an end-to-end relationship within the mold and the cross-tube insert disposed adjacent the first mold topography associated with the fluid inlet port and the relief valve port of the housing, after which plastic is introduced. After the plastic cures, the molds are pulled opposite one another and the cores are pulled opposite one another and substantially perpendicular to the pull of the molds to yield the net shape molded housing. The cross-tube insert provides flow communication between the fluid inlet port and the relief valve port of the molded housing.

In another aspect, the present invention provides a mold and core system for making a net molded plastic pump housing having a fluid inlet port, a fluid outlet port, and a pressure relief valve port, each in flow communication with a pump cavity. In an embodiment, the mold and core system includes a first mold having has an interior surface topography configured to correspond in negative to exterior topographies of a first portion of the pump housing and to correspond in negative to topography associated with the fluid inlet port, the fluid outlet port, and the relief valve port of the housing; a second mold having an interior surface topography configured to correspond in negative to exterior topographies of a second portion of the housing; a first core having an exterior shape configured to correspond in negative to interior topographies of a proximate portion of the cavity of the housing; and at least a second core having an exterior shape configured to correspond in negative to interior topographies of a distal portion of the cavity of the housing.

The first and second molds and the first and second cores are configured such that none of the fluid inlet port, the fluid outlet port, or the pressure relief valve port of the housing produced using the molds and cores have any intersecting geometry. The first and second molds are assembled facing one another with the first and second cores positioned adjacent one another in an end-to-end relationship within the molds and a cross-tube insert is disposed adjacent the first mold topography associated with the fluid inlet port and the relief valve port of the housing, after which plastic is introduced. After the plastic cures, the molds are pulled opposite one another and the cores are pulled opposite one another and substantially perpendicular to the pull of the molds to yield the net shape molded housing. Further, the cross-tube insert provides flow communication between the fluid inlet port and the relief valve port of the molded housing.

In still another aspect, the present invention provides a net molded plastic pump housing having a proximate portion and a distal portion and an internal cavity within the pump housing. In one embodiment, the pump housing a fluid inlet port, a fluid outlet port, and a pressure relief valve port, each in flow communication with the pump cavity; and a cross-tube insert disposed within the pump housing cavity and in flow communication with the fluid inlet port and the pressure relief valve port. None of the fluid inlet port, the fluid outlet port, or the pressure relief valve port of the housing have any intersecting geometry. Further, the net-mold nature of the housing eliminates the need for more than de minimis secondary machining such that the total glass fiber exposure is maintained at or below 1 in$^2$ total exposure.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
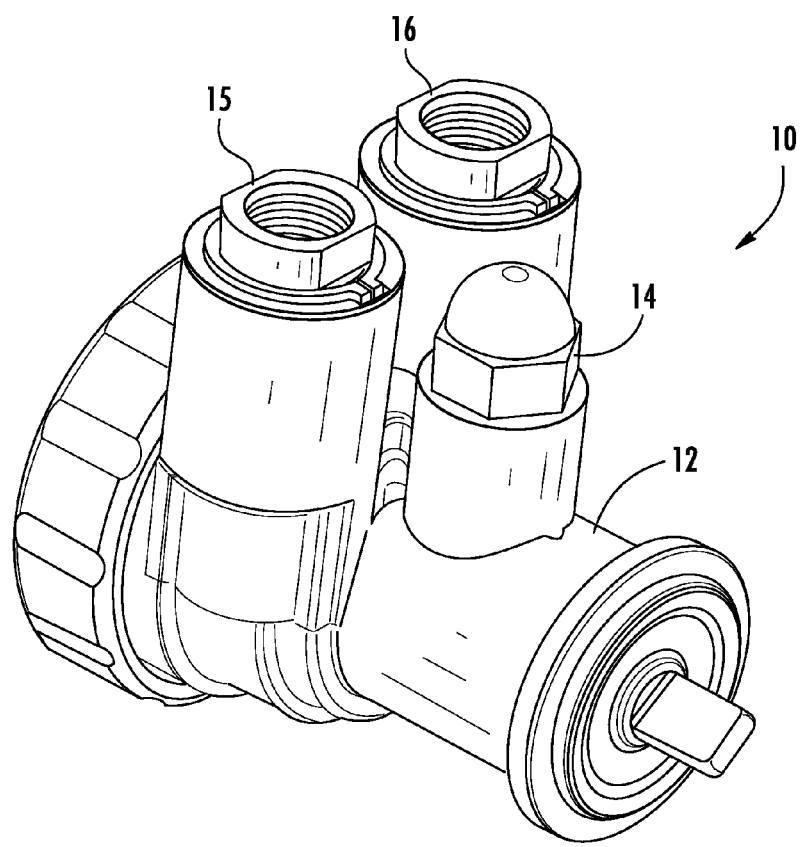
FIG. 1 is a front perspective view of a pump made according to the disclosure.
Figure 2:
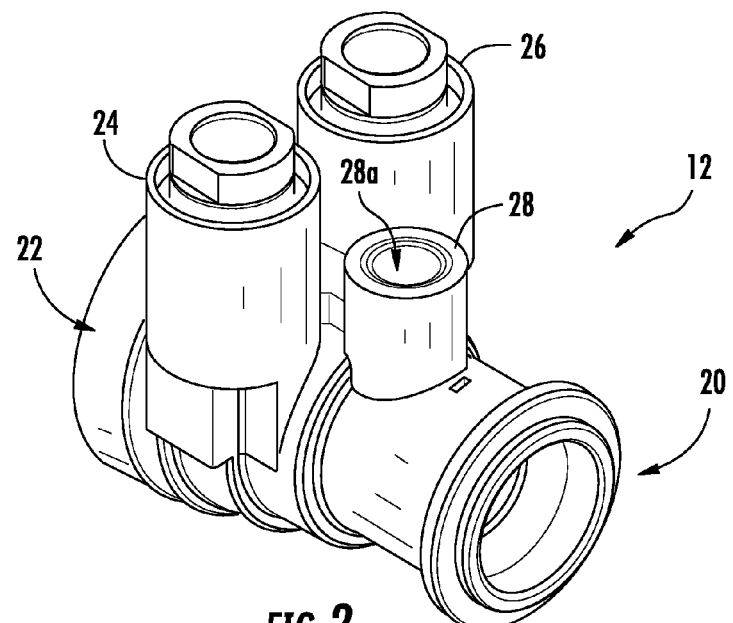
FIG. 2 is a front perspective view of a pump housing made according to the disclosure.
Figure 3:
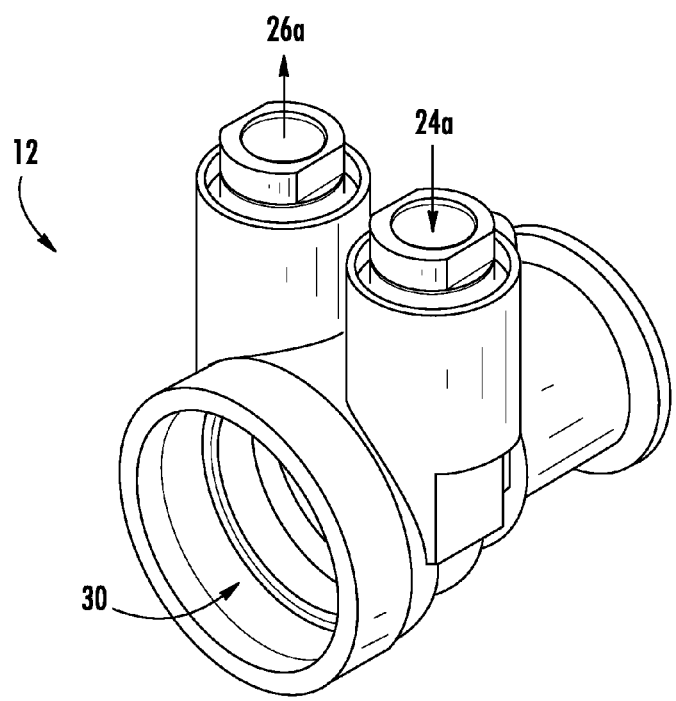
FIG. 3 is a rear perspective view of the pump housing of FIG. 2.
Figure 4:
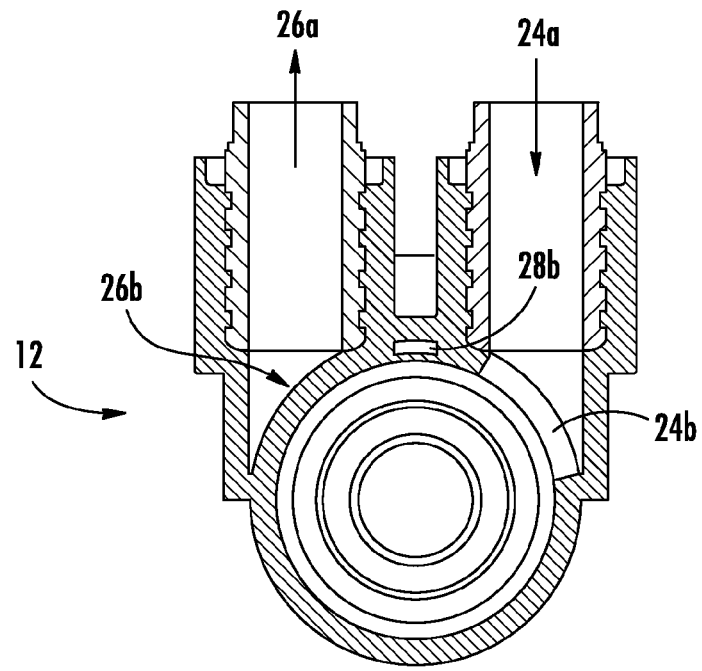
FIG. 4 is a cross-sectional rear-end view of the pump housing of FIG. 2.
Figure 5:
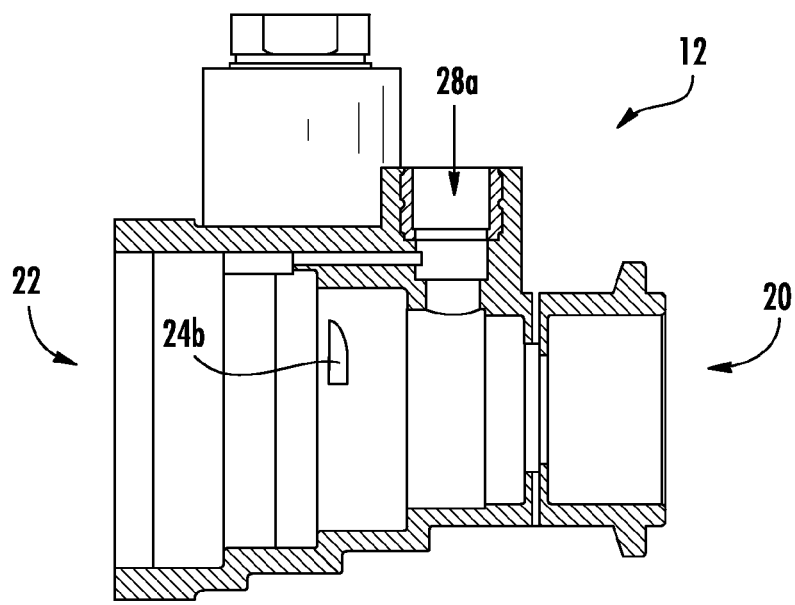
FIG. 5 is a cross-sectional side view of the pump housing of FIG. 2.

The disclosure relates to methods for manufacturing a pumps having a plastic housing that are net-shape molded. Pumps according to the disclosure are particularly suited for pumping water for use in beverages, such as for pumping water in carbonated water systems, for espresso machines, and beer cooling systems.

As used herein, "net-shape molded" means that after the housing is molded it is substantially ready for use and does not require any further significant machining or shaping or polishing, such as the type typically accomplished using computer numerical controlled (CNC) equipment. That is, the terminology "net-shape molded" as used herein will be understood to mean that the housing as molded is substantially ready for use and any additional machining is de minimis and less than about one square inch of the wetted interior surface is subjected to further machining after being formed by molding.

Accordingly, as the housing as molded does not require further machining, shaping, polishing, or otherwise treatment to be ready to use, the wetted surfaces are not disturbed so as to expose glass fiber to the wetted surface and render the pump unacceptable for food-grade applications. Thus, such pump housings made of glass filled plastics can be made to meet glass fiber limits such that the total glass fiber exposure is maintained at or below 1 in$^2$ total exposure. In addition, by avoiding the need for significant further machining or the like, manufacturing costs associated with further treatment are saved.

With initial reference to FIGS. 1-7, in a first embodiment the disclosure relates to a method for manufacturing a pump 10 having a plastic housing 12 that is net-shape molded. The pump 10 is, for example, configured as a positive displacement vane pump having various moving and static pump parts that cooperate with the housing 12, such as a rear cap, endplate, o-rings, bearings, seals, liner, rotor, vanes, alignment pins, snap rings, shaft, pressure relief valve 14, port inserts 15 and 16, washers, inlet strainer, and the like. The pump 10 is coupled, as by bolting or clamping or otherwise connecting to a pump motor, such as an integrated or external electric motor, having an output shaft.

The pump housing 12 is of one-piece molded plastic construction, and the plastic material may be reinforced with fibers such as glass fibers for added strength and temperature resistance. The housing 12 is configured to include a proximate portion 20 and a distal portion 22. The proximate portion and the distal portion 22 define the ends of the pump cavity and are sealed as by use of caps, seals, and the like, with the proximate portion 20 adapted to be mounted onto a pump motor.

The housing 12 also includes three fluid passage ports configured for permitting desired fluid travel during operation of the pump, namely, a fluid inlet port 24 for receiving a fluid at a first pressure, a fluid outlet port 26 for expelling the fluid at a second and greater pressure, and a pressure relief valve port 28 through which fluid and pressure may escape in the event of a pressure exceeding a predetermined level. The housing 12 defines an interior pump cavity 30, with each of the ports 24, 26, and 28 being in flow communication therewith via port entrances 24a, 24b, 26a, 26b, and 28a, 28b, associated with the ports 24, 26, and 28, respectively.

It has been discovered that in providing a net molded housing, it is advantageous that the molds utilized to make the housing 12 be configured such that none of the fluid passage ports, e.g., the fluid inlet port 24, the fluid outlet port 26, and the pressure relief valve port 28, have intersecting geometry. This configuration of the molds and the pump housing results from the requirement that the housing be net molded and not require more than de minimis finishing, since the ports represent complex structure that, if made with intersecting geometry, would require more than de minimis finishing.

Figure 6:
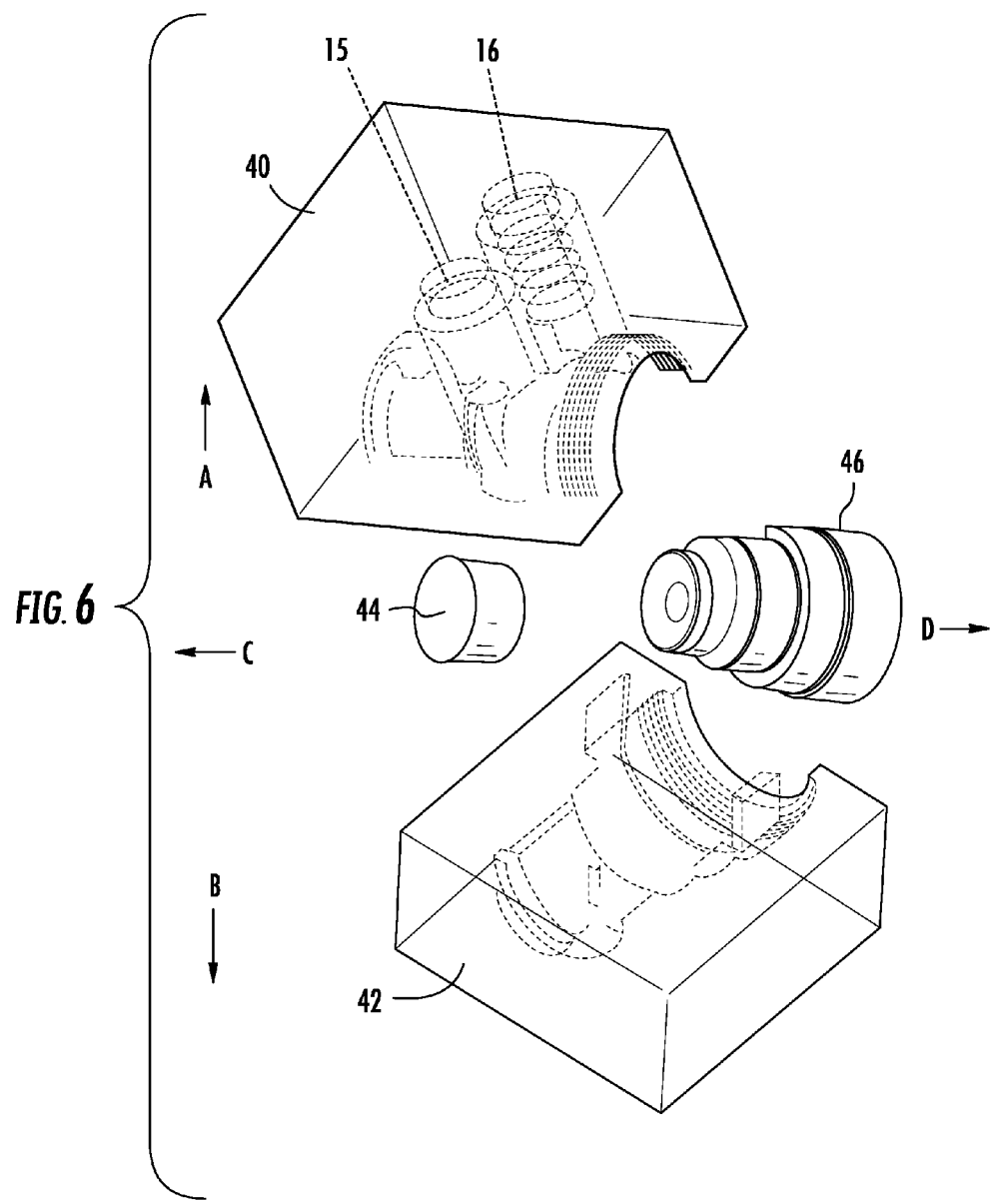
FIGS. 6 and 7 are exploded views of molds and cores used to make the housing of FIG. 2 according to the disclosure.
Figure 7:
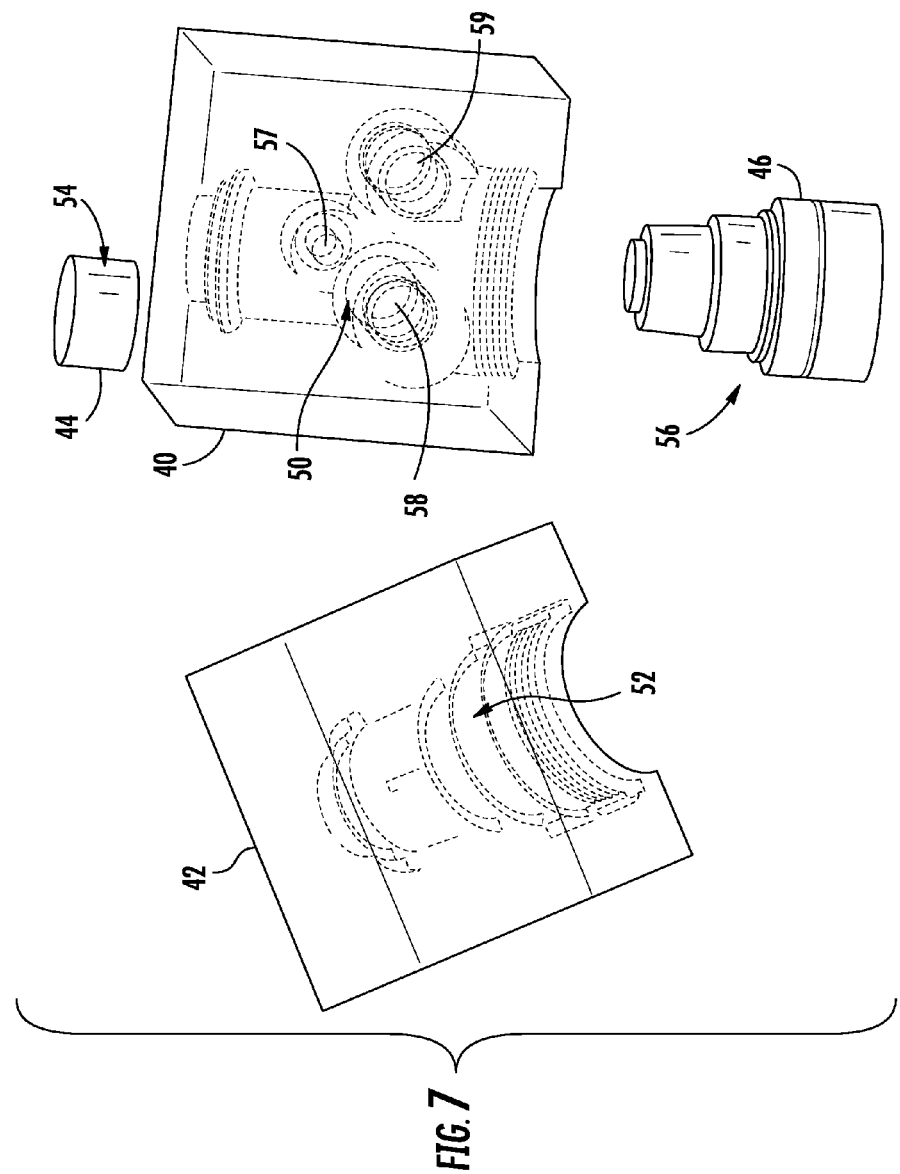
Figure 8:
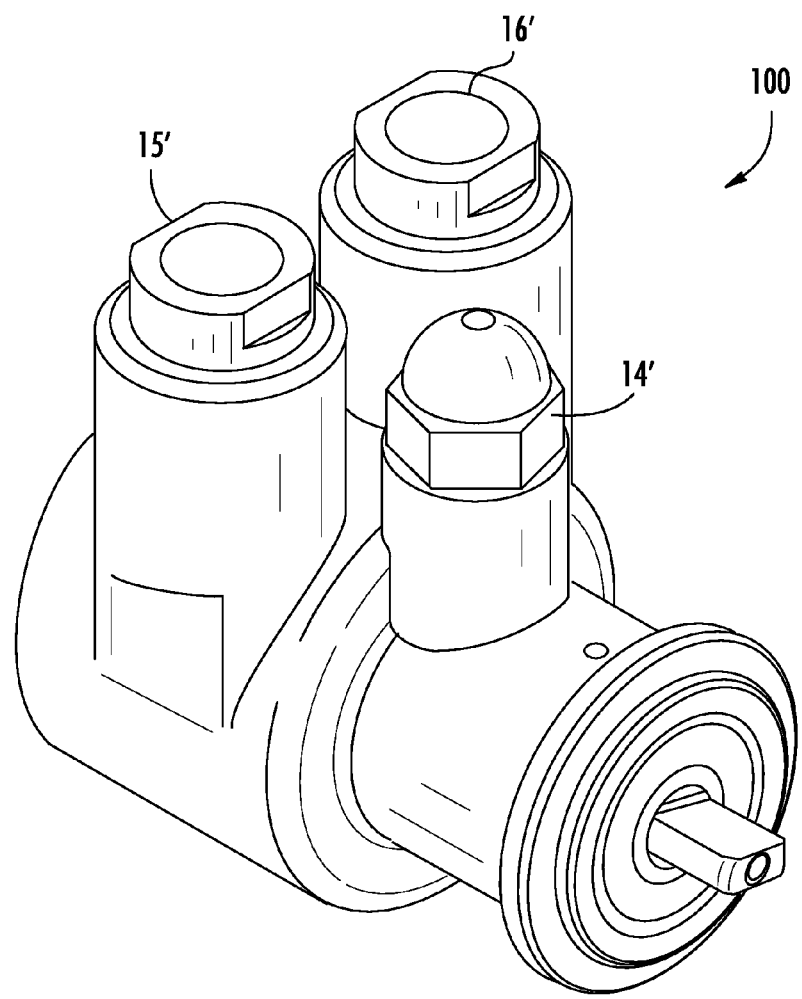
FIG. 8 is a front perspective view of another embodiment of a pump made according to the disclosure.
Figure 9:
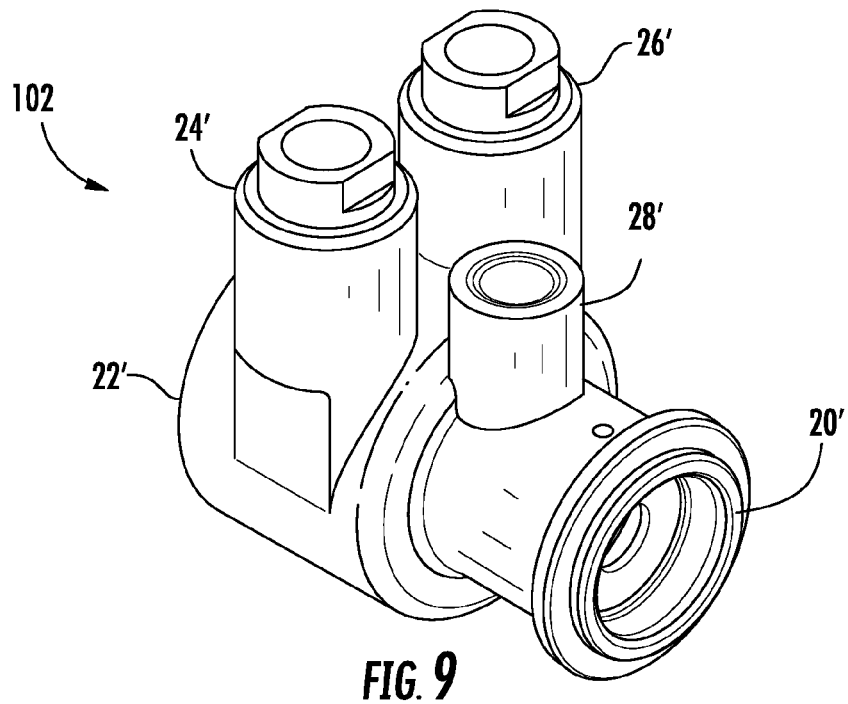
FIG. 9 is a front perspective view of a pump housing for the pump of FIG. 8
Figure 10:
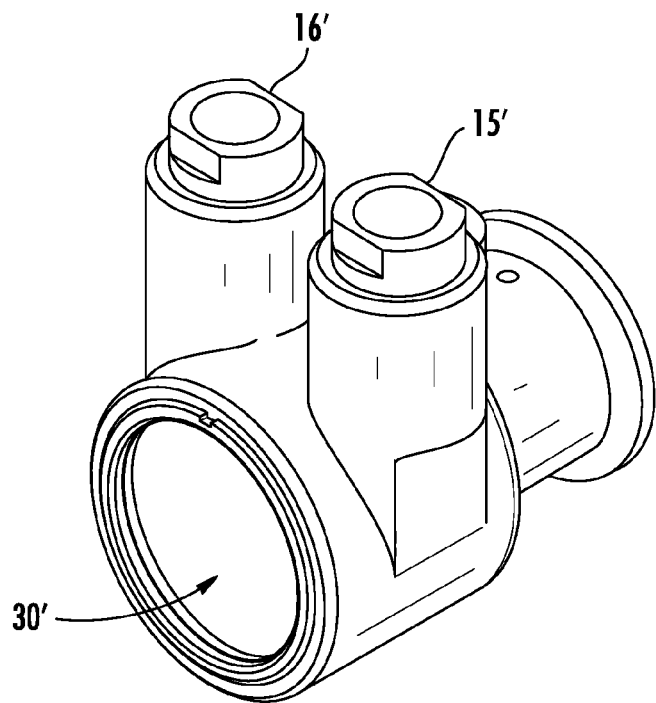
FIG. 10 is a rear perspective view of the pump housing of FIG. 9.
Figure 11:
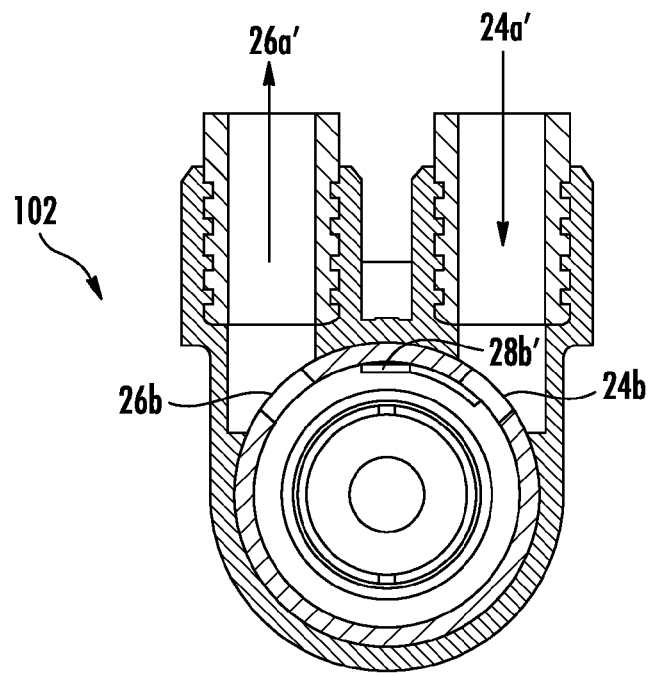
FIG. 11 is a cross-sectional rear-end view of the pump housing of FIG. 9.
Figure 12:
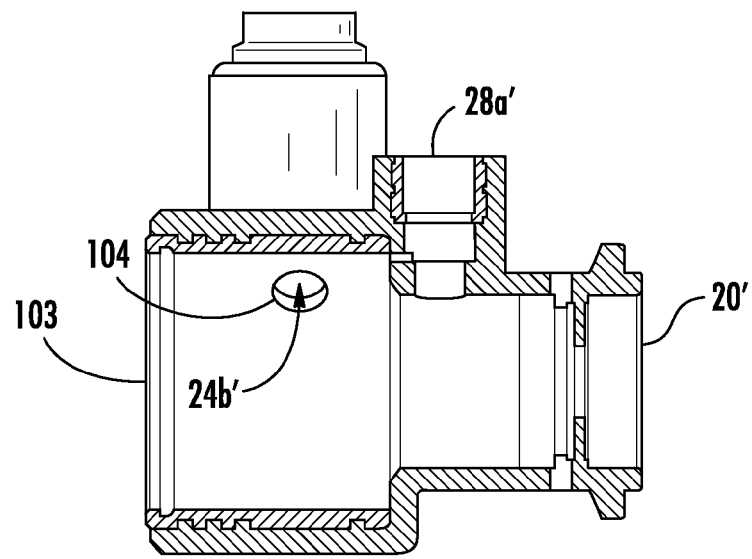
FIG. 12 is a cross-sectional side view of the pump housing of FIG. 9.
Figure 13:
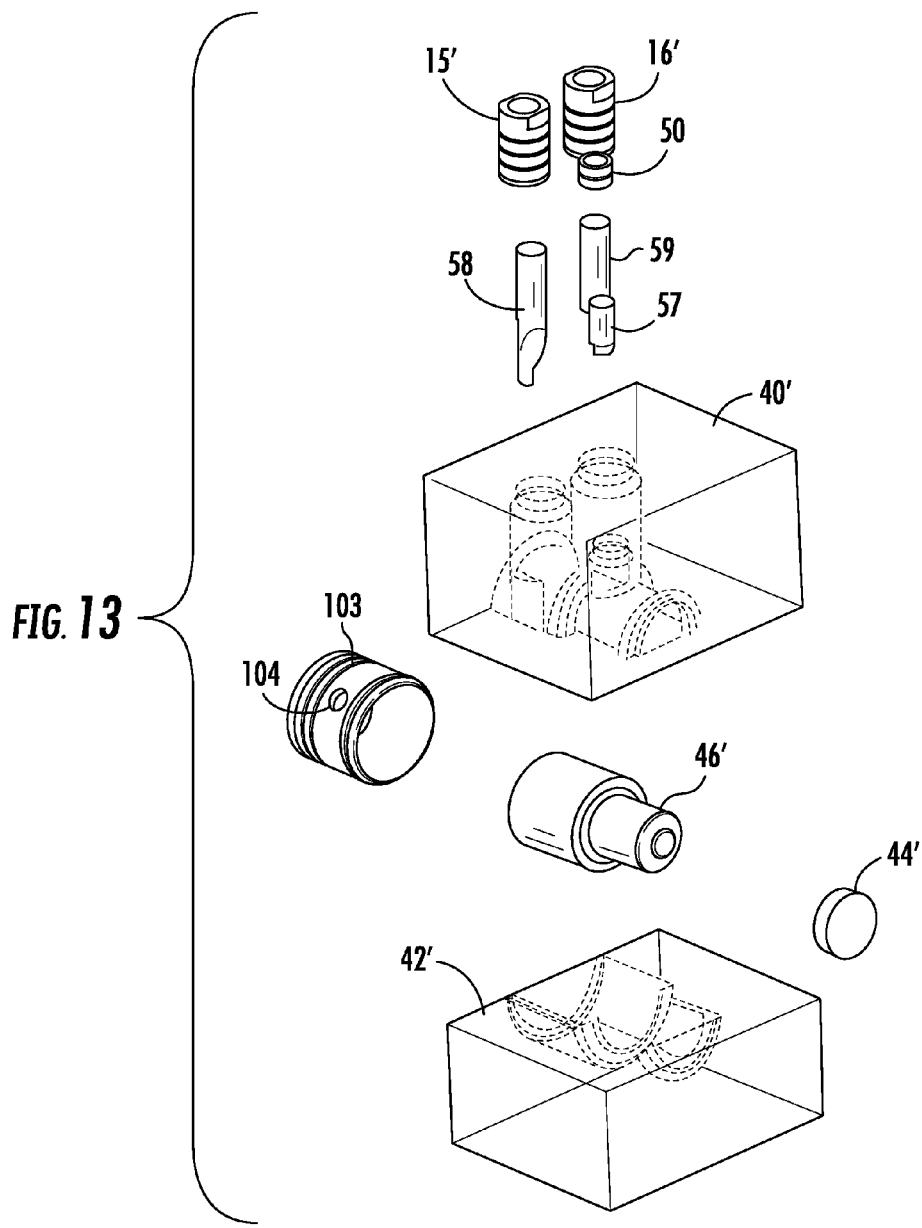
FIG. 13 is an exploded view of molds and cores used to make the housing of FIG. 9 according to the disclosure.
Figure 14:
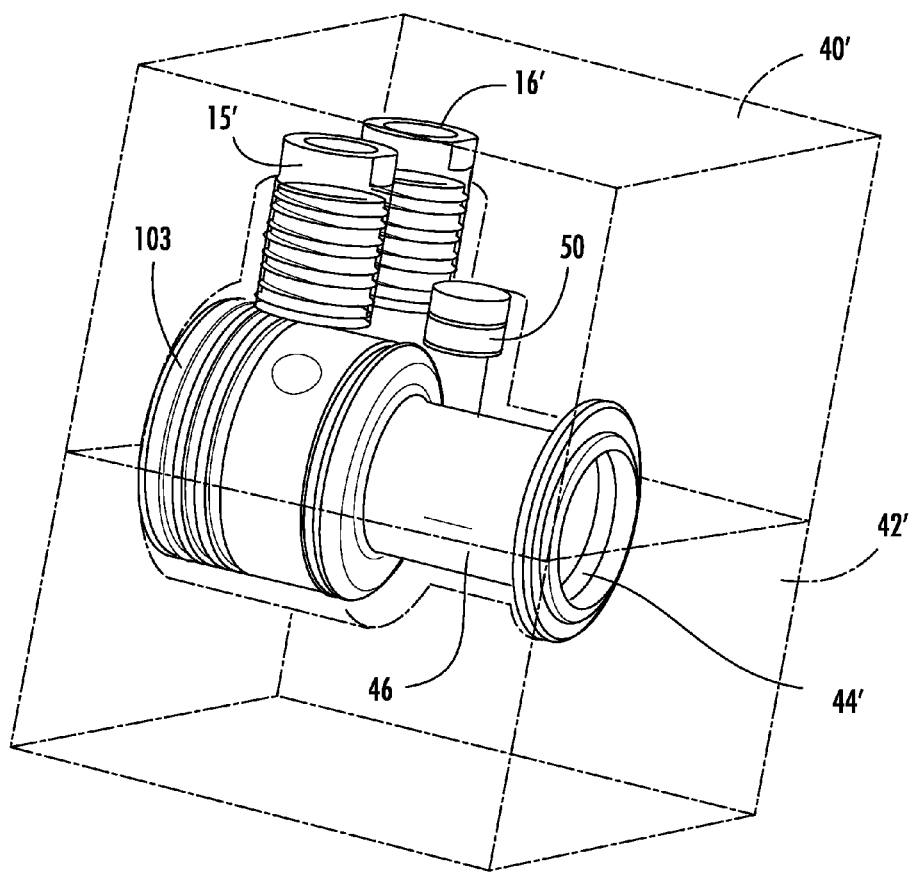
FIG. 14 is an assembled view thereof.

Accordingly, and with reference now to FIGS. 6 and 7, the housing 12 is manufactured utilizing an upper mold 40, a lower mold 42, a proximate core 44, and a distal core 46. The molds 40 and 42 and the cores 44 and 46 are advantageously configured such that none of the fluid passage ports, e.g., the fluid inlet port 24, the fluid outlet port 26, and the pressure relief valve port 28, of the housing 12 produced using the molds and cores have any intersecting geometry. As part of this, it will be appreciated that the cores 44 and 46 therefore do not pass through any of the fluid passage ports.

The structure of the molds and cores also facilitate a simplified molding process involving simplification in separating the molds and the cores from the molded housing 12. In this regard, it will be understood that the molds 40 and 42 are assembled facing one another with the cores 44 and 46 positioned adjacent one another in an end-to-end relationship within the molds 40 and 42, after which plastic is introduced. After the plastic cures, the molds 40 and 42 are pulled opposite one another, as indicated by the arrows A and B (FIG. 6), and the cores 44 and 46 are pulled opposite one another and substantially perpendicular to the pull of the molds 40 and 42, as indicated by the arrows C and D (FIG. 6).

The upper mold 40 has an interior surface topography 50 configured to correspond in negative to exterior topographies of an upper portion of the housing 12 and to correspond in negative to topography associated with the fluid inlet port 24, the fluid outlet port 26, and the relief valve port 28. The lower mold 42 has an interior surface topography 52 configured to correspond in negative to exterior topographies of a lower portion of the housing 12. The core 44 is solid and has an exterior shape 54 configured to correspond in negative to interior topographies of a proximate portion of the cavity 30 of the housing 12, which is substantially cylindrical. The core 46 is solid and has an exterior shape 56 configured to correspond in negative to interior topographies of a distal portion of the cavity 30 of the housing 12, which is a stepped cylindrical profile. The upper mold 40 includes rods 57, 58, and 59 onto which the inserts 14, 15, and 16, respectively, are slidably received.

As will be appreciated from the views, all of the portions of the mold 40 corresponding to the fluid inlet port 24, the fluid outlet port 26, and the relief valve port 28 terminate at the distal core 46, and the core 46 does not pass through any of these fluid passage ports of the housing 12. It has been discovered that this construction and configuration of the molds and cores enables the molds to be made so that the part as molded is ready for use and does not require any further machining or shaping or polishing. That is, the mold surfaces conform to the desired final shape and dimensions, with no further treatment.

In conjunction with this, it has been discovered that this feature of the mold components enables a simple mold pull procedure in which the upper and lower molds are removed by a first linear pulling motion in which the upper and lower molds are pulled away from one another, and the cores are removed by a second linear pulling motion in which the in which the proximate and distal cores are pulled in opposite directions, with the second linear pulling motion being substantially perpendicular to the first linear pulling motion.

This method of pulling the molds and the cores, as enabled by the configurations of the molds and the cores, has been observed to avoid the presence of flash, burrs, and other extraneous plastic on the molded part that would require further machining or shaping or polishing. Thus, the housing 12 molded according to the disclosure using the molds 40 and 42, and the cores 44 and 46 have been observed to be net-shape molded and to conform to the desired final shape and dimensions.

With reference now to FIGS. 8-15, a second embodiment according to the disclosure relates to a method for manufacturing a pump 100 having a plastic housing 102 that is net-shape molded. The housing 102 is substantially identical to the housing 102, except that it includes a distal bore insert 103 included during the molding. The bore insert 103 is preferably of stainless steel construction and located corresponding to the distal portion 22' of the housing 102. The insert 103 is preferably threaded. The addition of the insert 103 enables a stronger connection point than the plastic material of the housing and has been observed to provide improved operation including decreased noise during operation of the pump 100 as compared to the pump 10.

The housing 102 is made using molds 40' and 42' and cores 44' and 46'. The molds 40' and 42' and cores 44' and 46' are substantially identical to the molds 40 and 42 and cores 44 and 46, except some of the respective topographies are configured where necessary to receive the rear bore insert 103. That is, the bore insert 103 is provided to provide some of the more complex topography of the housing 102, such that the interior surfaces of the molds are simplified. In this regard, the various corresponding parts of the housing 102 and the molds 40' and 42', and cores 44' and 46' are referred to with the same numbers as the embodiment of FIGS. 1-7, except with a prime designation.

Figure 15:
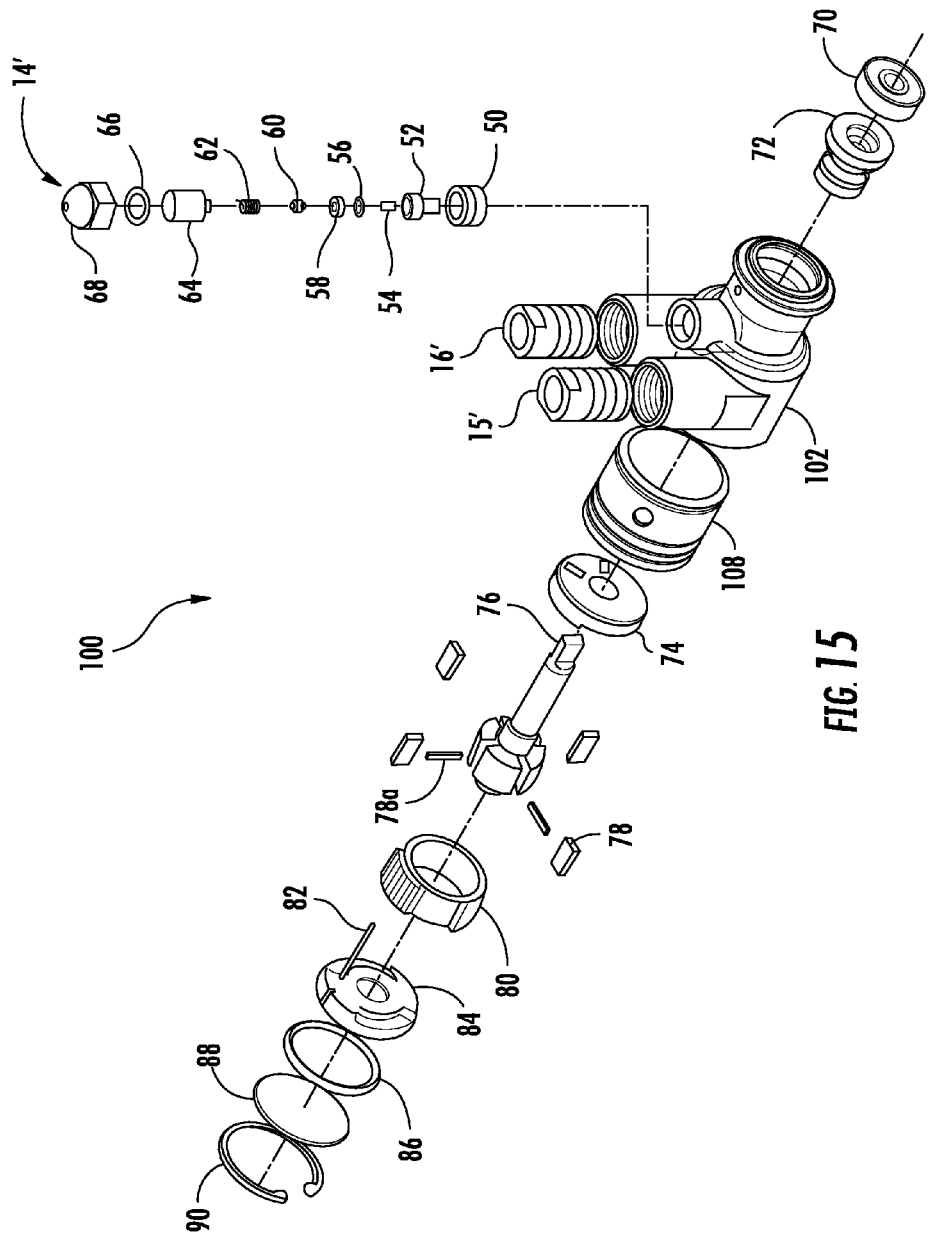
FIG. 15 is an exploded view showing additional components of the pump.
Figure 16:
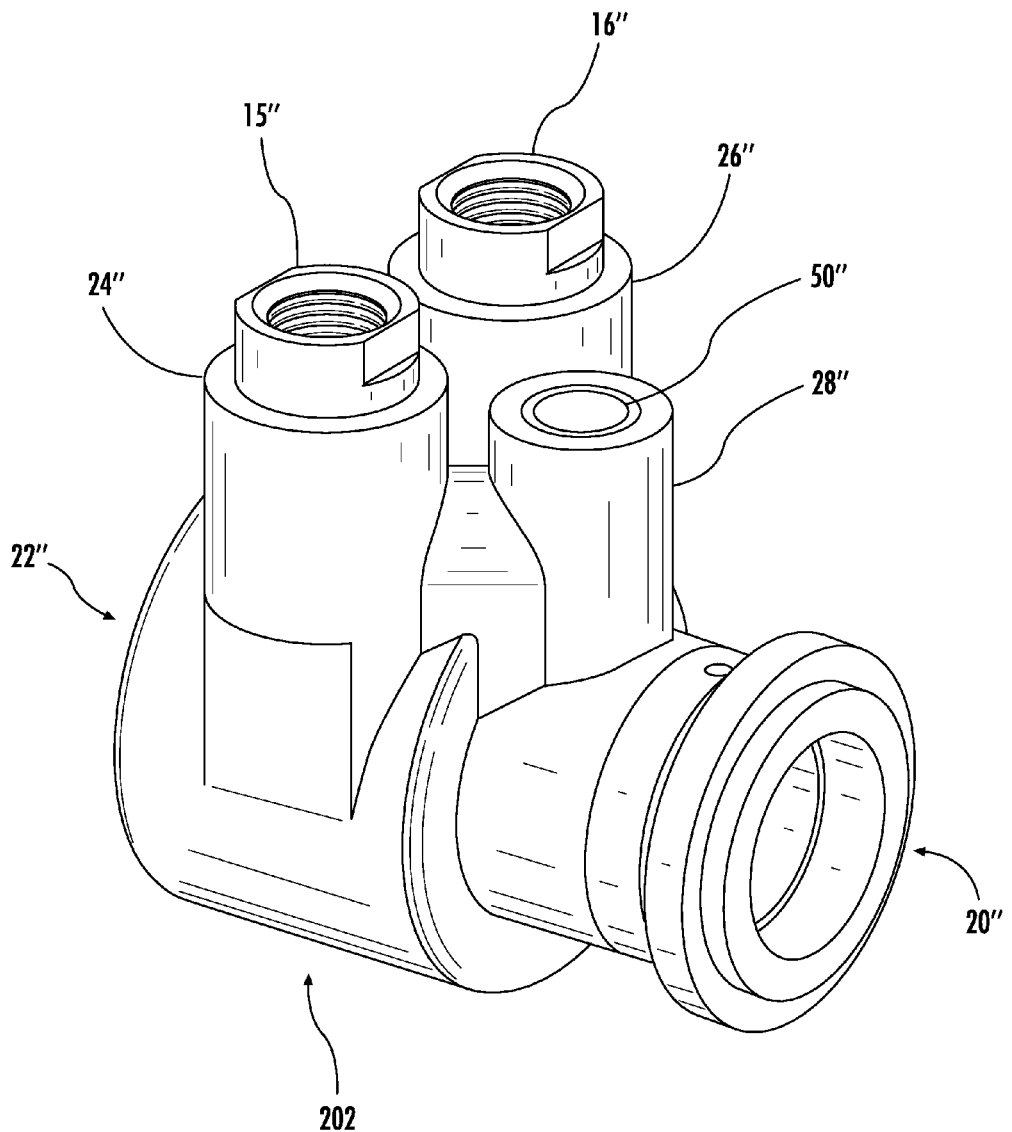
FIG. 16 is a front perspective view of another embodiment of a pump housing made according to the disclosure.
Figure 17:
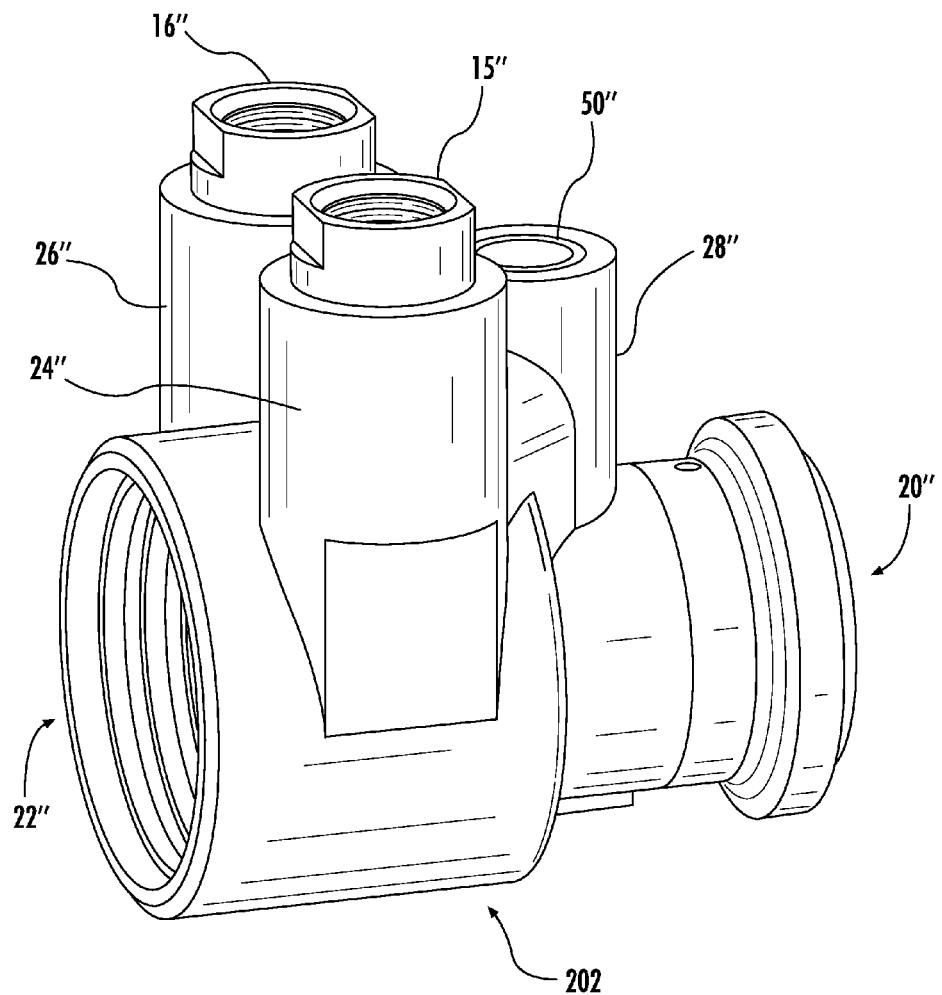
FIG. 17 is a rear perspective view of the pump housing of FIG. 16.

As shown in FIG. 15, the housing 102 is compatible with a variety of internal pump components to yield the pump 100. For example, as shown, the housing 102 is configured to receive the pressure valve 14' which includes valve insert 50, valve body 52, spring 54, o-ring 56, relief valve 58, valve cover 60, spring 62, adjusting screw 64, o-ring 66, and cap 68. Other components include ball bearing 70, seal 72, rear bearing 74, rotor 76 having vanes 78 spaced apart by pins 78a, plastic liner 80, alignment pin 82, front bearing 84, o-ring 86, plate 88, and snap-ring 90.

Figure 21:
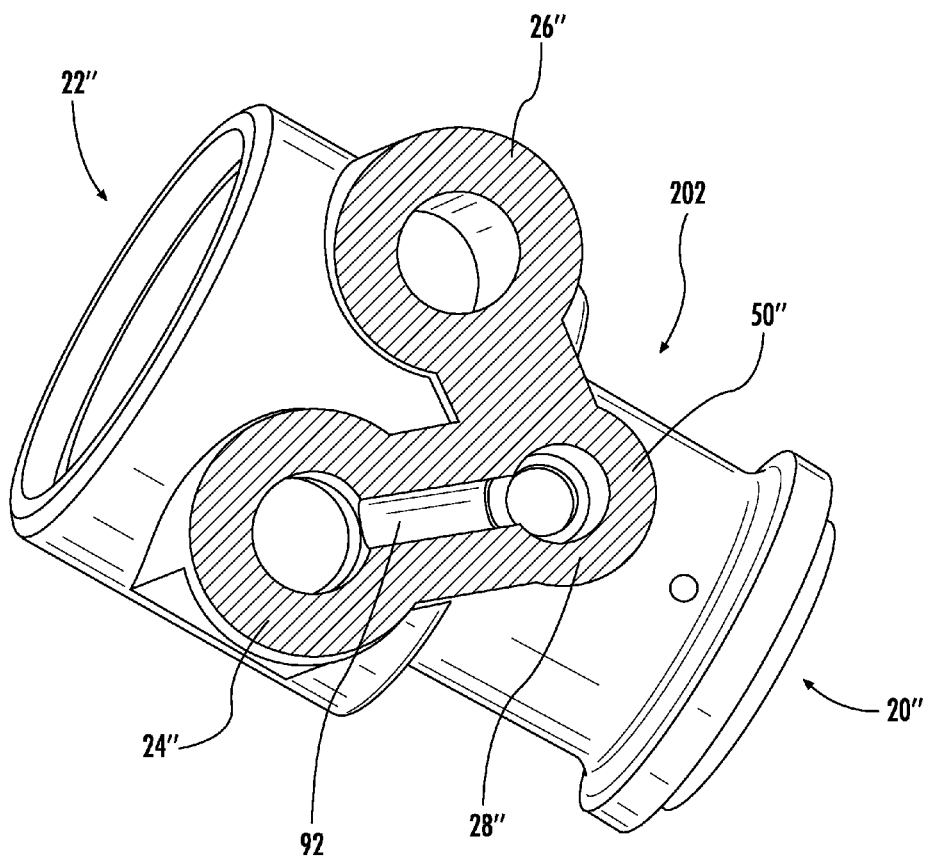
FIG. 21 is a cross-sectional top view of the pump housing of FIG. 16.

With reference now to FIGS. 16-23, a further embodiment according to the disclosure relates to a method for manufacturing a pump having a plastic housing 202 that is net-shape molded. The housing 202 is similar to the housing 12, except that an additional cross-tube insert 92 is incorporated into the housing 202. The housing 202 may, in some instances, also include a distal bore insert 103" included during the molding. As shown in FIG. 21, the cross-tube insert 92 provides flow communication between the pressure relief valve port 28" and the fluid inlet port 24". Thus in the event of an overpressure within the pump, excess fluid is allowed to pass through the pressure relief 28"—thereby reducing the excess pressure within the pump—and the excess fluid is recycled back to the fluid inlet port 24".

Figure 18:
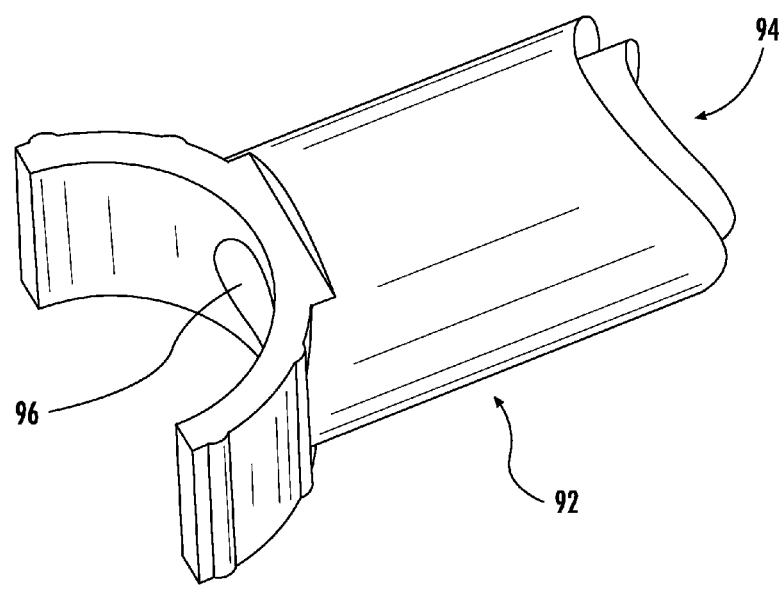
FIG. 18 is a front perspective view of a cross-tube insert made according to the disclosure.
Figure 19:
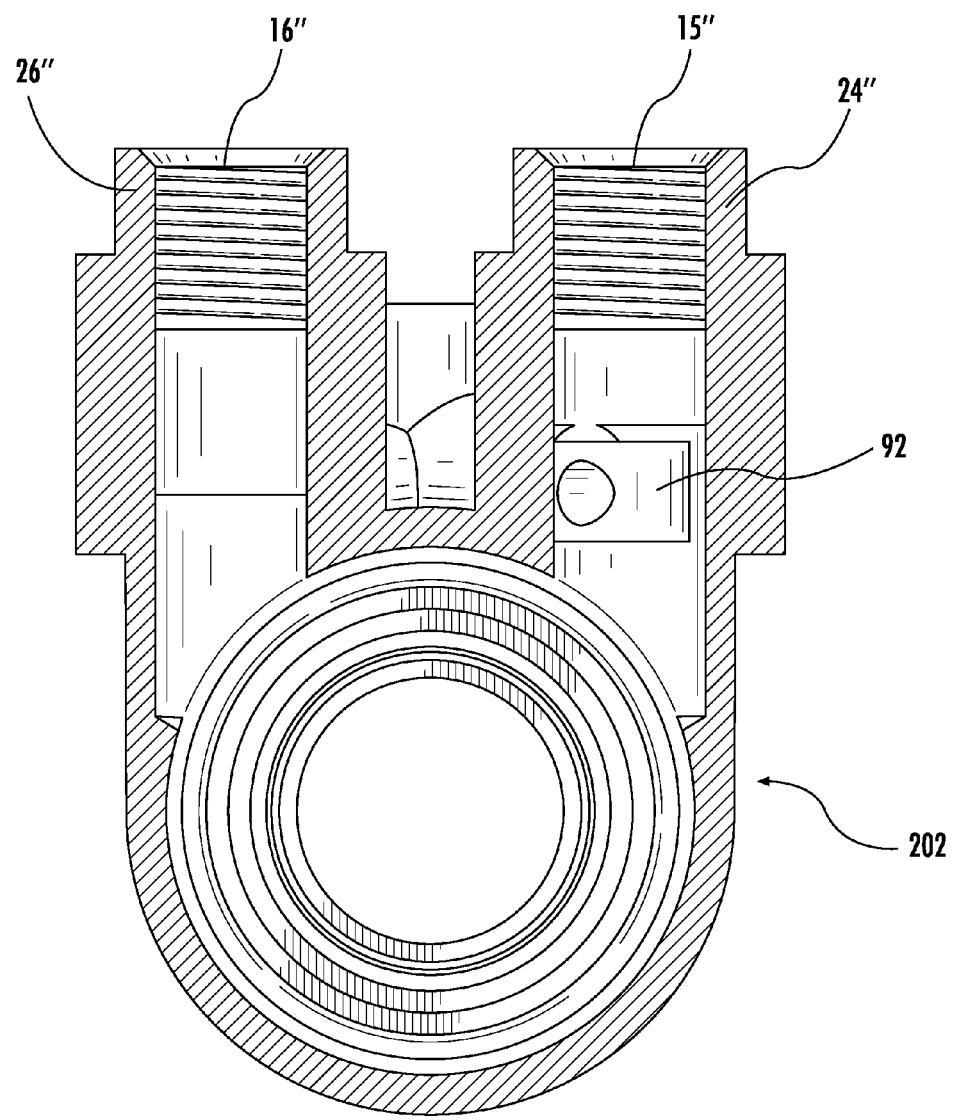
FIG. 19 is a cross-sectional rear-end view of the pump housing of FIG. 16.
Figure 20:
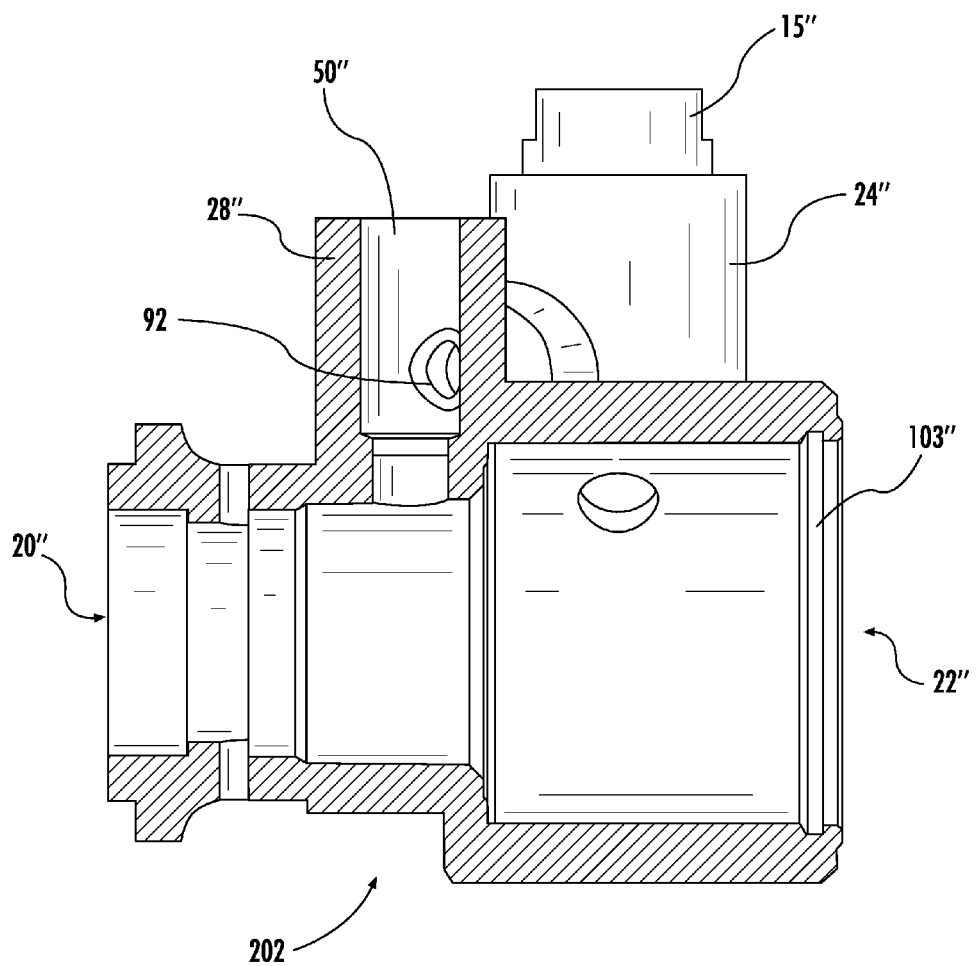
FIG. 20 is a cross-sectional side view of the pump housing of FIG. 16.

As seen in FIG. 18, the cross-tube insert 92 is hollow and generally cylindrical in shape, preferably with ends 94 and 96 conformed to the generally cylindrical shape of pressure relief valve port 28" and the fluid inlet port 24". The cross-tube insert may be metallic, but is preferably made from the same plastic material as the remainder of the housing 202. If the same plastic material is used as for the housing 202, the material of the cross-tube insert 92 may partially fuse with the plastic of the housing during addition and curing of the plastic for the housing.

Figure 22:
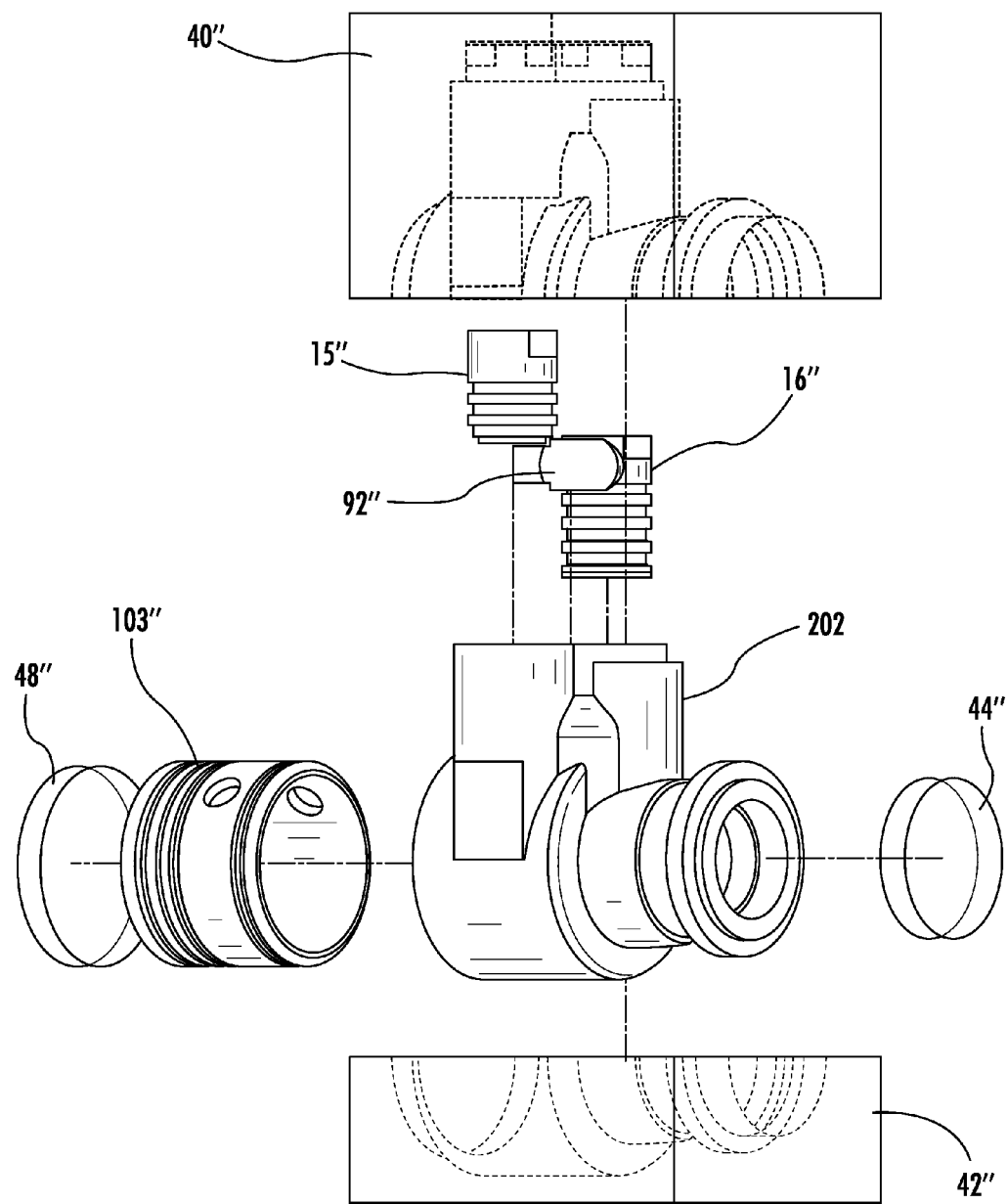
FIG. 22 is an exploded view of molds and cores used to make the housing of FIG. 16 according to the disclosure.
Figure 23:
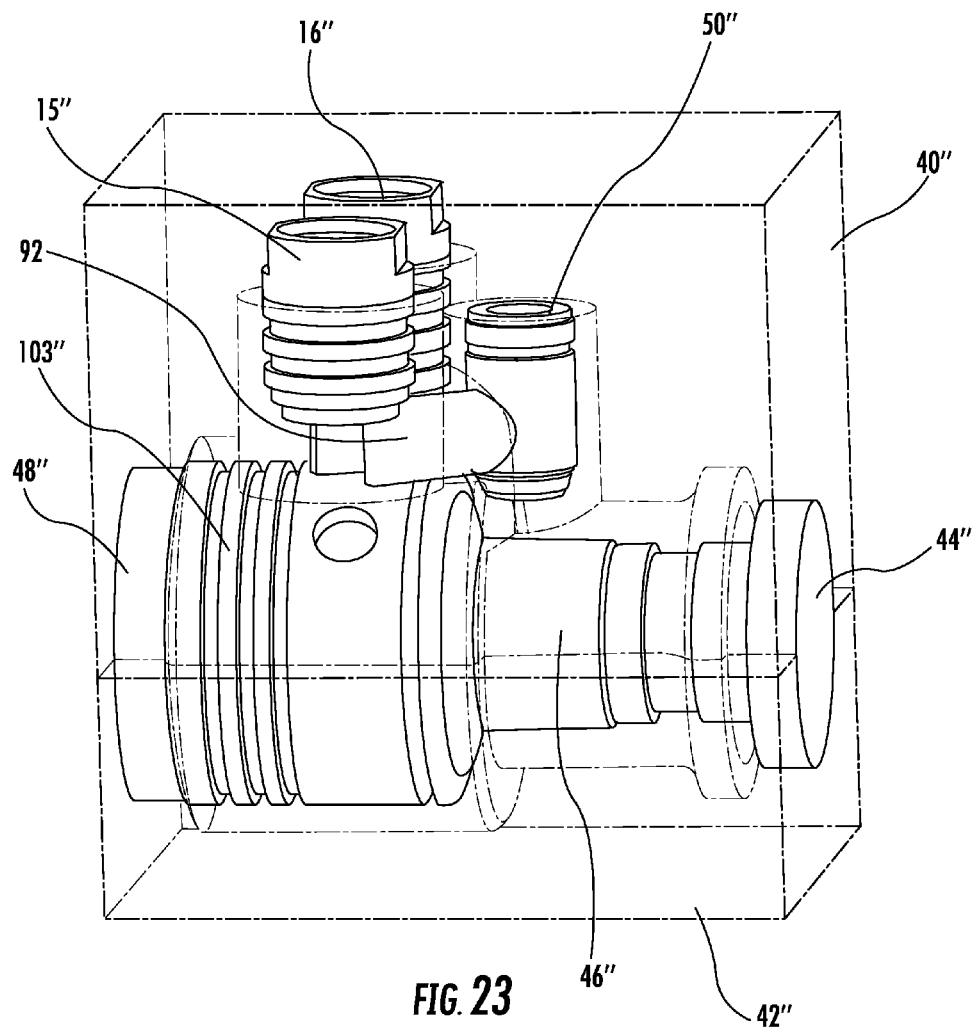
FIG. 23 is an assembled view thereof.

The housing 202 is made using molds 40" and 42" and a plurality of cores as illustrated in FIGS. 22 and 23. The molds 40" and 42" are substantially identical to the molds 40 and 42, except some of the respective topographies are adapted to receive the cross-tube insert 92 adjacent the first mold topography associated with the fluid inlet port and the relief valve port of the housing. Likewise, the cores 44" and 46" are similar to cores 44 and 46, except that in some instances the distal interior topography of the housing 202 may be provided by a plurality of cores 46" and 48" rather than a single distal core.

In general, the various corresponding parts of the housing 202 and the molds 40" and 42", and cores 44" and 46" are referred to with the same numbers as the embodiments of FIGS. 1-7 and FIGS. 8-15, except with a double prime designation.

As with the aforementioned embodiments, the housing 202 is compatible with a variety of internal pump components, such as seals, o-rings, front and rear bearings, a rotor having sliding vanes, an endplate, and a snap-ring.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A method of making a net molded plastic pump housing having a fluid inlet port, a fluid outlet port, and a pressure relief valve port, each in flow communication with a pump cavity, the method comprising the steps of:
   providing a first mold having has an interior surface topography configured to correspond in negative to exterior topographies of a first portion of the housing and to correspond in negative to topography associated with the fluid inlet port, the fluid outlet port, and the relief valve port of the housing;
   providing a second mold having an interior surface topography configured to correspond in negative to exterior topographies of a second portion of the housing;
   providing a first core having an exterior shape configured to correspond in negative to interior topographies of a proximate portion of the cavity of the housing;
   providing at least a second core having an exterior shape configured to correspond in negative to interior topographies of a distal portion of the cavity of the housing; and
   providing a cross-tube insert having a hollow, generally cylindrical shape;
   wherein the first and second molds and the first and second cores are configured such that none of the fluid inlet port, the fluid outlet port, or the pressure relief valve port of the housing produced using the molds and cores have any intersecting geometry,
   wherein the first and second molds are assembled facing one another with the first and second cores positioned adjacent one another in an end-to-end relationship within the mold and the cross-tube insert disposed adjacent the first mold topography associated with the fluid inlet port and the relief valve port of the housing, after which plastic is introduced,
   wherein after the plastic cures, the molds are pulled opposite one another and the cores are pulled opposite one another and substantially perpendicular to the pull of the molds to yield the net shape molded housing, and
   wherein the cross-tube insert provides flow communication between the fluid inlet port and the relief valve port of the molded housing.

2. The method of claim 1, wherein the plastic comprises glass-filled plastic.

3. The method of claim 1, wherein the net-mold nature of the housing eliminates the need for more than de minimis secondary machining such that the total glass fiber exposure is maintained at or below 1 in$^2$ total exposure.

4. The method of claim 1, wherein the housing is a housing for use with a positive displacement vane pump.

5. The method of claim 1, further comprising a distal bore insert located adjacent the second core proximate the distal portion of the cavity of the housing.

6. The method of claim 5, wherein the distal bore insert is threaded.

* * * * *